US011180872B2

(12) United States Patent
Qiu et al.

(10) Patent No.: US 11,180,872 B2
(45) Date of Patent: Nov. 23, 2021

(54) IMPACT RESISTANT, SHRINKABLE WOVEN TUBULAR SLEEVE AND METHOD OF CONSTRUCTION THEREOF

(71) Applicant: Federal-Mogul Powertrain, LLC, Southfield, MI (US)

(72) Inventors: Xiaodan Qiu, Exton, PA (US); Tianqi Gao, Exton, PA (US); Danny Winters, Downington, PA (US); Ritesh Mehbubani, Royersford, PA (US); Zhong Huai Zhang, Pottstown, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 56 days.

(21) Appl. No.: 15/684,857

(22) Filed: Aug. 23, 2017

(65) Prior Publication Data

US 2018/0062364 A1    Mar. 1, 2018

Related U.S. Application Data

(60) Provisional application No. 62/378,968, filed on Aug. 24, 2016.

(51) Int. Cl.
*H02G 3/04* (2006.01)
*D03D 15/587* (2021.01)
(Continued)

(52) U.S. Cl.
CPC ......... *D03D 15/587* (2021.01); *D03D 1/0043* (2021.05); *D03D 3/02* (2013.01);
(Continued)

(58) Field of Classification Search
None
See application file for complete search history.

(56) References Cited

U.S. PATENT DOCUMENTS 3,669,157 A    6/1972 Woodall, Jr. et al.
5,273,080 A    12/1993 Morohashi et al.
(Continued)

FOREIGN PATENT DOCUMENTS

CN    105164880 A    12/2015
DE    102007023062 A1    11/2008
(Continued)

OTHER PUBLICATIONS

Machine translation of DE 102007023062, Piwonski et al. (Year: 2008).*

(Continued)

*Primary Examiner* — Shawn Mckinnon
(74) *Attorney, Agent, or Firm* — Robert L. Stearns; Dickinson Wright, PLLC

(57) ABSTRACT

A woven sleeve for routing and protecting an elongate member and method of construction thereof are provided. The sleeve has a woven wall with a circumferentially continuous outer periphery extending along a central axis between opposite ends. Warp yarns extend generally parallel to the central axis and fill yarns extend generally transversely to the warp yarns. At least a portion of the wall has a plurality of layers in abutment with one another. At least one of the fill yarns is provided as a shrinkable yarn that provides the wall with an ability to remain in a first, diametrically enlarged assembly state to facilitate assembly of the sleeve about the elongate member, whereupon the wall can be radially constricted to a second, diametrically constricted assembled state to maintain the sleeve in the desired location, while also minimizing the outer circumference to facilitate use of the sleeve in tight spaces.

21 Claims, 6 Drawing Sheets

(51) Int. Cl.
*D03D 3/02* (2006.01)
*D03D 11/02* (2006.01)
*D03D 15/00* (2021.01)
*D03D 1/00* (2006.01)

(52) U.S. Cl.
CPC ............ *D03D 11/02* (2013.01); *D03D 15/00* (2013.01); *H02G 3/0481* (2013.01)

(56) References Cited

U.S. PATENT DOCUMENTS

| | | |
|---|---|---|
| 5,843,542 A | 12/1998 | Brushafer et al. |
| 6,265,039 B1 | 7/2001 | Drinkwater et al. |
| 6,777,051 B1 | 8/2004 | Mazzer |
| 8,137,779 B2 | 3/2012 | Russell |
| 8,163,362 B2 | 4/2012 | Russell |
| 9,028,937 B2 | 5/2015 | Harris et al. |
| RE45,673 E | 9/2015 | Russell |
| 2009/0220716 A1 | 9/2009 | Russell |
| 2009/0226653 A1* | 9/2009 | Harris ............... B32B 1/08 428/36.1 |
| 2010/0203268 A1 | 8/2010 | Russell |
| 2013/0243985 A1 | 9/2013 | Furata et al. |
| 2014/0272218 A1 | 9/2014 | Thomas et al. |
| 2015/0337490 A1 | 11/2015 | Burdette, III et al. |

FOREIGN PATENT DOCUMENTS

| | | |
|---|---|---|
| EP | 113196 | 1/1982 |
| JP | 2016091689 A | 5/2016 |
| JP | 2016516912 A | 6/2016 |
| WO | 2008138589 A2 | 11/2008 |
| WO | 2012073757 A1 | 6/2012 |
| WO | 2016075425 A1 | 5/2016 |

OTHER PUBLICATIONS

International Search Report, dated Nov. 20, 2017 (PCT/US2017/048301).

* cited by examiner

Picks

| | T1 | T2 | B1 | B2 | T1 | T2 | B1 | B2 | T12 | B12 |
|---|---|---|---|---|---|---|---|---|---|---|
| 8 | X | X | X |   | X | X | X | X | X |   |
| 7 | X | X |   |   | X | X | X |   | X |   |
| 6 | X |   |   |   | X | X |   |   |   |   |
| 5 |   |   |   |   | X |   |   |   |   |   |
| 4 | X | X | X | X | X | X | X |   | X | X |
| 3 | X | X | X |   | X | X |   |   | X | X |
| 2 | X | X |   |   | X |   |   |   | X |   |
| 1 | X |   |   |   |   |   |   |   | X |   |

Harnesses

X = Means Warp On Top
☐ = Means Fill On Top
T1 = First Top Layer
T2 = Second Top Layer
B1 = First Bottom Layer
B2 = Second Bottom Layer
T12 = First and Second Top Layers
B12 = First and Second Bottom Layers

IMPACT RESISTANT, SHRINKABLE WOVEN TUBULAR SLEEVE AND METHOD OF CONSTRUCTION THEREOF

CROSS-REFERENCE TO RELATED APPLICATION

This application claims the benefit of U.S. Provisional Application Ser. No. 62/378,968, filed Aug. 24, 2016, which is incorporated herein by reference in its entirety.

BACKGROUND OF THE INVENTION

1. Technical Field

This invention relates generally to textile sleeves for protecting elongate members, and more particularly to impact resistant, shrinkable woven tubular sleeves.

2. Related Art

It is known to contain elongate members, such as wires, wire harnesses, cables and conduits of various types in woven sleeves to provide protection to the elongate members against impact and abrasion, fluid and thermal affects. In applications where high impact resistance is needed to prevent damage to the sleeve and the contents therein, both wrappable and circumferentially continuous, tubular sleeves are known. Though each can be made to provide suitable protection against impact forces and abrasion, each comes with drawbacks. Wrappable sleeves require secondary features to secure them about the elongate member being protected, such as clamps, straps, tapes and the like, and thus, additional labor and time is required during assembly, thereby increasing the cost of assembly. Further, having to keep the secondary features in stock is costly. Further yet, the secondary feature can present a possibility of coming undone during use, thereby risking direct exposure of the elongate member to environmental effects. In addition, wrappable sleeves typically have a non-uniform thickness with opposite edges being overlapped on one another, and thus, the outer envelop/surface of the sleeve has a non-uniform appearance having an increased thickness region that can prevent it from being used in tight areas, or otherwise make assembly difficult. Another drawback to wrappable sleeves is the need to keep different sizes in stock for different diameter applications, and this further increases inventory and cost. In addition, in order to provide the desired impact resistance, it is generally necessary to form the wall being relatively thick, which can lead to the inability to use the wrappable sleeve in relatively tight spaces.

With regard to circumferentially continuous, tubular sleeves, as with wrappable sleeves, a need to keep different sizes in stock for different diameter applications exists. Further, tubular sleeves are commonly fixed in diameter, and as such, it can be difficult or impossible to use this type of sleeve in applications where the elongate member has one or more regions of increased size relative to the inner diameter of the sleeve, such that the sleeve will not fit over the increased size region(s), wherein the increased size region(s) could be presented by an enlarged mechanical or electrical connector, for example. Further, fixed diameter tubular sleeves typically require secondary fasteners to secure them in position, such as by applying a tape about one or both of the ends and on the member extending through the sleeve, for example, and thus, they suffer from the same drawbacks discussed above for wrappable sleeves. In addition, as discussed above, in order to provide the desired impact resistance, it is generally necessary to form the wall being relatively thick, thus taking away from the ability to use the sleeve in relatively tight spaces.

Accordingly, what is needed is a sleeve that provides enhanced protection to an elongate member contained therein, particularly against impact, abrasion and contamination, remains fixed in place while in use without the need for secondary fastening mechanisms, is useful and easy to be installed over a wide range of elongate member diameters, is economical in manufacture and assembly, and exhibits a long and useful life.

SUMMARY OF THE INVENTION

One aspect of the disclosure provides a monolithic, one piece textile sleeve for routing and protecting elongate members. The sleeve includes an elongate, woven wall having a circumferentially continuous, tubular outer periphery extending along a central axis between opposite open ends. The wall includes warp yarns extending generally parallel to the central axis and fill yarns extending generally transversely to the warp yarns. At least a portion of the wall is multilayered, having a plurality of layers overlying one another, wherein the plurality of layers abut one another on the same side of the central axis with one another. One or more of the fill yarns is provided as a shrinkable yarn. The shrinkable yarn provides the wall with an ability to be radially constricted from a first, diametrically enlarged state, also referred to as an assembly state, to facilitate assembly of the sleeve about the elongate member to be protected, to a second, diametrically constricted state, also referred to as an assembled state, to facilitate securing and maintaining the sleeve in the desired location, while also minimizing the outer envelop/circumference to facilitate use of the sleeve in tight spaces.

In accordance with another aspect of the invention, the plurality of layers overlying and abutting one another can be locked together, via at least one weft yarn and/or at least one warp yarn common to the plurality of abutting layers, at discrete locations to prevent separation of the abutting layers from one another, thereby preventing the inadvertent insertion of the elongate member being protected between the abutting layers.

In accordance with another aspect of the invention, the plurality of layers overlying and abutting one another can be locked together via at least one warp yarn meandering over weft yarns within an outermost one of the layers and under weft yarns within an innermost one of the layers along an axially extending length of the sleeve.

In accordance with another aspect of the invention, the plurality of layers overlying and abutting one another can be locked together to prevent separation of the layers from one another via at least one weft yarn extending from one of the layers and meandering over one or more warp yarns within the other of the overlying and abutting layer(s).

In accordance with another aspect of the invention, the plurality of layers overlying and abutting one another can extend about a substantially entirety of the outer periphery.

In accordance with another aspect of the invention, the plurality of layers overlying and abutting one another can extend about a select circumferentially extending multi-layered portion of the outer periphery, with a single layer extending about a remainder of the outer periphery between opposite edges of the multi-layered portion. Accordingly, an increased thickness region of the wall can be formed in specifically desired regions to provide enhanced protection against impact forces, abrasion, thermal conditions, or otherwise, while a single layered region can be provided in a region not requiring the enhanced degree of protection. As such, the sleeve can be made having an optimal outer envelop/circumference to permit the sleeve to be used in relative tight spaces, while also minimizing the cost associated manufacture and material content of the sleeve.

In accordance with another aspect of the invention, the woven wall has diametrically opposite sides, one of the sides having a first number of layers and the other of the sides having a second number of layers, wherein the first and second number of layers can be provided as being different from one another, thereby providing different degrees of protection against impact forces from one another and providing the wall with an optimal thickness and outer envelop/circumference for the given application.

In accordance with another aspect of the invention, the at least one shrinkable weft yarn can be activated to shrink via selected application of at least one of heat, fluid, and ultraviolet radiation.

In accordance with another aspect of the invention, the at least one shrinkable weft yarn can be woven in a single pick as a common yarn with at least one non-shrinkable yarn via the shrinkable and non-shrinkable yarn being twisted, served, or inserted with one another.

In accordance with another aspect of the invention, the warp yarns can be provided as multifilaments and/or monofilaments of any desired material.

In accordance with another aspect of the invention, the warp yarns can be provided as at least one or more of PET, nylon, PP, PE, PPS, PEEK, and Nomex.

In accordance with another aspect of the invention, the wall can be woven including low melt yarn having a melt temperature less than that of the remaining yarns, wherein the low melt yarn, upon being melted, facilitates cutting the sleeve to length and minimizing the potential for end fray.

In accordance with another aspect of the invention, the first, diametrically enlarged state can be provided having a first diameter and the second, diametrically constricted state can be provided having a second diameter, wherein a ratio between the respective first and second diameters can range between about 1.5:1 to 5:1 or greater.

In accordance with another aspect of the invention, at least one of the plurality of layers overlying and abutting one another can be formed at least in part of a different type of yarn material from another of the plurality of layers overlying and abutting one another.

In accordance with another aspect of the invention, at least one of the plurality of layers overlying and abutting one another can be formed having a different weave pattern from another of the plurality of layers overlying and abutting one another.

In accordance with yet another aspect of the invention, a method of constructing a monolithic, one piece textile sleeve for routing and protecting elongate members is provided. The method includes weaving an elongate wall with warp yarns extending generally parallel to a central axis between opposite open ends of the wall and fill yarns extending generally transversely to the warp yarns, with at least a portion of the wall being formed having a plurality of woven layers overlying and abutting one another along a common side of the central axis with one another. Further, forming the woven wall to be circumferentially continuous, such that the plurality of layers overlying and abutting one another and the remaining portion of the wall bound a single, common cavity extending between the opposite open ends, with the cavity being sized for receipt of an elongate member to be protected therein. Further yet, providing one or more of the fill yarns as being shrinkable yarn, wherein the shrinkable yarn provides the wall with an ability to be radially constricted from a first, diametrically enlarged state to a second, diametrically constricted state.

In accordance with another aspect of the invention, the method can further include weaving the plurality of layers overlying, abutting, inseparable and locked arrangement with one another in discrete locations via a weft and/or warp yarn of one of the abutting layers being looped about a respective warp and/or weft yarn of the other of the abutting layers to prevent inadvertent separation of the abutting layers from one another, thereby preventing inadvertent insertion of the elongate member being protected between the abutting layers.

In accordance with another aspect of the invention, the method can further include locking the plurality of layers overlying and abutting one another together by weaving at least one warp yarn to meander over weft yarns within an outermost one of the layers and under weft yarns within an innermost one of the layers along an axially extending length of the sleeve, thereby preventing the inadvertent insertion of an elongate member to be protected between the layers locked to one another.

In accordance with another aspect of the invention, the method can further include locking the plurality of layers overlying and abutting one another together by weaving at least one weft yarn from one of the layers to meander over or under one or more warp yarns within the other of the plurality of layers, thereby preventing the inadvertent insertion of an elongate member to be protected between the layers locked to one another.

In accordance with another aspect of the invention, the method can further include weaving the plurality of layers overlying and abutting one another to extend about a substantial entirety of the outer periphery.

In accordance with another aspect of the invention, the method can further include weaving the plurality of layers overlying and abutting one another about a discrete portion of the outer periphery and weaving a single layer extending about a remainder of the outer periphery.

In accordance with another aspect of the invention, the method can further include weaving the wall having opposite sides extending along diametrically opposite sides of the central axis from one another and weaving one of the sides having a first number of layers and weaving the other of the sides having a second number of layers, wherein the first and second number of layers are different, thereby providing the wall having different levels of protection, such as against impact forces, and providing the wall with an optimal thickness and outer envelop/circumference for the given application.

In accordance with another aspect of the invention, the method can further include providing the at least one shrinkable yarn as being activateable to shrink via selected application of at least one of heat, fluid, and ultraviolet radiation.

In accordance with another aspect of the invention, the method can further include weaving the at least one shrinkable yarn as a single pick with a non-shrinkable yarn, with the shrinkable and non-shrinkable yarns being twisted, served or inserted with one another.

In accordance with another aspect of the invention, the method can further include providing the warp yarns as multifilaments and/or monofilaments.

In accordance with another aspect of the invention, the method can further include providing the warp yarns as at least one or more of PET, nylon, PP, PE, PPS, PEEK, and Nomex yarns.

In accordance with another aspect of the invention, the method can further include weaving the wall to increase in density from a first non-shrunken state to a second shrunken state by 2 times or more.

In accordance with another aspect of the invention, the method can further include weaving the wall to include low melt yarn having a melt temperature less than that of the remaining yarns, wherein the low melt yarn can be melted and solidified to facilitate cutting the sleeve to length with minimal end fray resulting at the cut ends.

In accordance with another aspect of the invention, the method can further include providing the first, diametrically enlarged, non-shrunken assembly state having a first diameter and providing the second, diametrically shrunken fully assembled state having a second diameter, wherein a ratio between the first and second diameters can range between about 1.5:1 to 5:1 or greater.

In accordance with another aspect of the invention, the method can further include weaving at least one of the plurality of layers overlying and abutting one another having a different type of yarn material from another of the plurality of layers overlying and abutting one another.

In accordance with another aspect of the invention, the method can further include weaving at least one of the plurality of layers overlying and abutting one another having a different weave pattern from another of the plurality of layers overlying and abutting one another.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
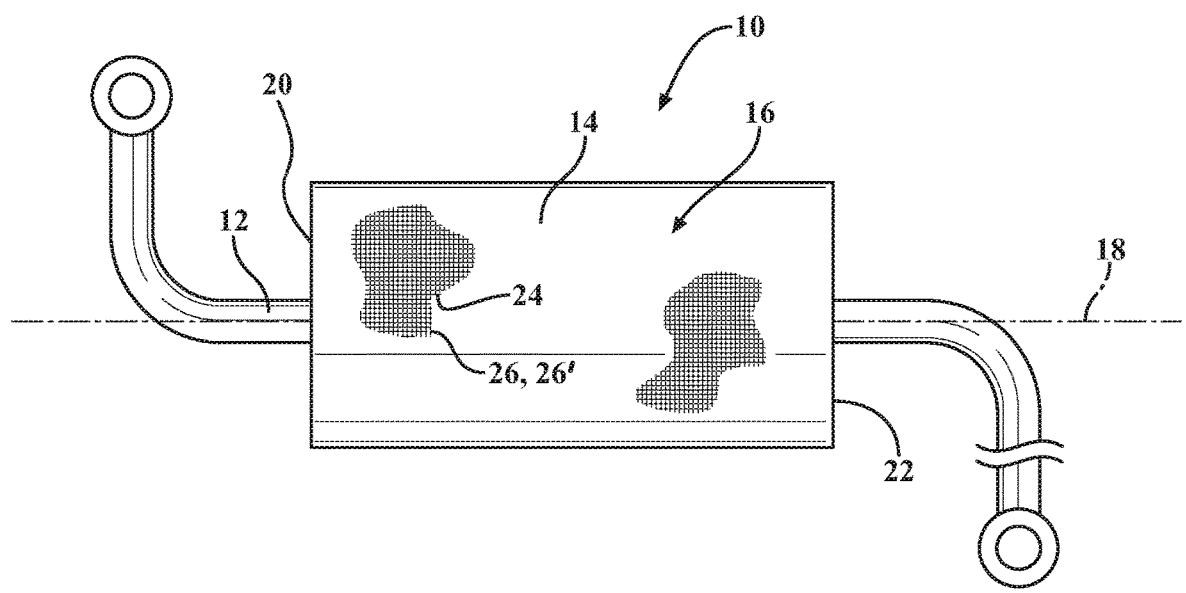
FIG. 1 is a schematic perspective view of a tubular, woven sleeve constructed in accordance with one aspect of the invention shown in a less than fully assembled, expanded state.
Figure 1A:
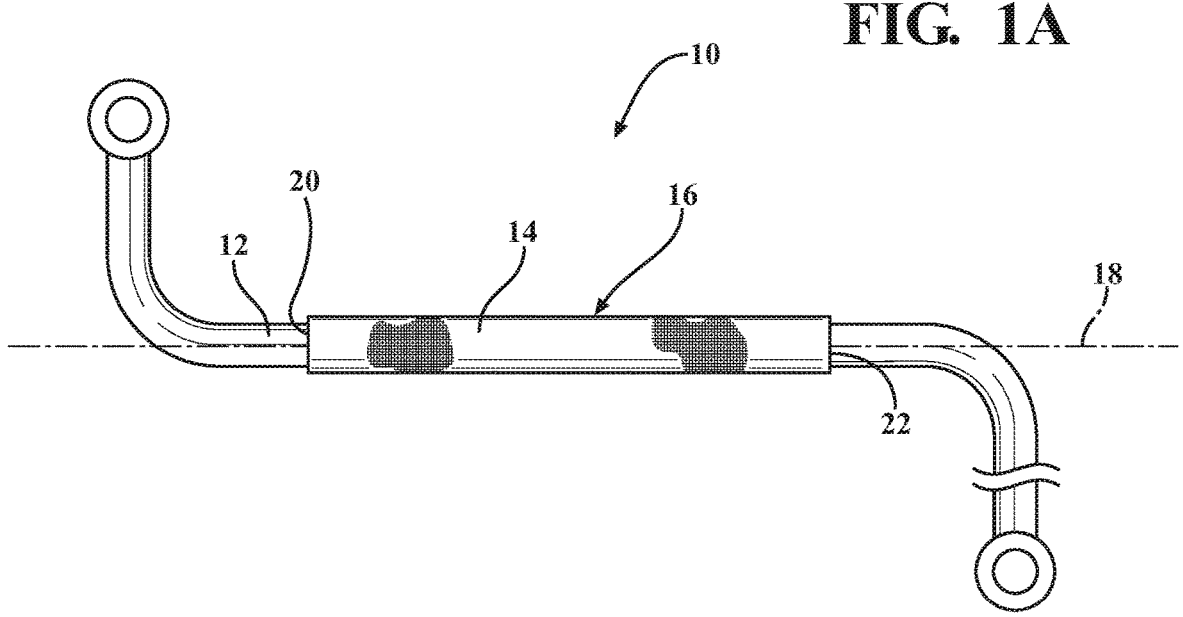
FIG. 1A is a view similar to FIG. 1 with the sleeve shown in a fully assembled, contracted state.

Referring in more detail to the drawings, FIG. 1 schematically illustrates a monolithic, single piece woven protective tubular sleeve, referred to hereafter as sleeve 10, constructed in accordance with one aspect of the invention, shown disposed about an elongate member 12 to be protected, with the sleeve 10 shown in a first, diametrically enlarged, assembly state. FIG. 1A illustrates the sleeve 10 in a second, diametrically shrunken, fully assembled state about the elongate member 12. The sleeve 10 includes an elongate, woven wall 14 having a circumferentially continuous, tubular outer periphery 16 and inner cavity 17 extending along a central longitudinal axis 18 between opposite open ends 20, 22. It is to be understood that by being circumferentially continuous and tubular, that the sleeve 10 does not have lengthwise extending free side edges. The wall 12 includes warp yarns 24 extending generally parallel to the axis 18, with generally meaning that the yarns 24 could be truly parallel or slightly skewed therefrom, and fill yarns 26 extending generally transversely to the warp yarns 24, with generally meaning that the yarns 26 could be truly transverse to the warp yarns 24 or slightly out of perpendicularity therefrom. At least a portion of the wall 14, extending fully between the opposite ends 20, 22, is multilayered, having a plurality of layers overlying and abutting one another. At least some, and possibly all of the fill yarns 26 include at least one shrinkable yarn. The shrinkable fill yarn 26 provides the wall 14 with an ability to be radially contracted from a first, diametrically enlarged assembly state (FIG. 1) to a second, diametrically constricted fully assembled state (FIG. 1A). The sleeve 10 is primarily intended for routing and protecting the elongate member 12 extending through the cavity 17, such as wires, a wire harness, or conduit, for example, against damage from impact forces, while also providing protection against exposure to abrasion and the ingress of contamination, debris and the like. The region of the wall 14 including a plurality of overlying, abutting layers provides enhanced protection to the elongate member 12 against all the aforementioned effects, particularly providing enhanced protection against impact forces, while at the same time allowing the sleeve 10 to occupy a minimal outer envelop, thereby being useful in tight confines.

Figure 2A:
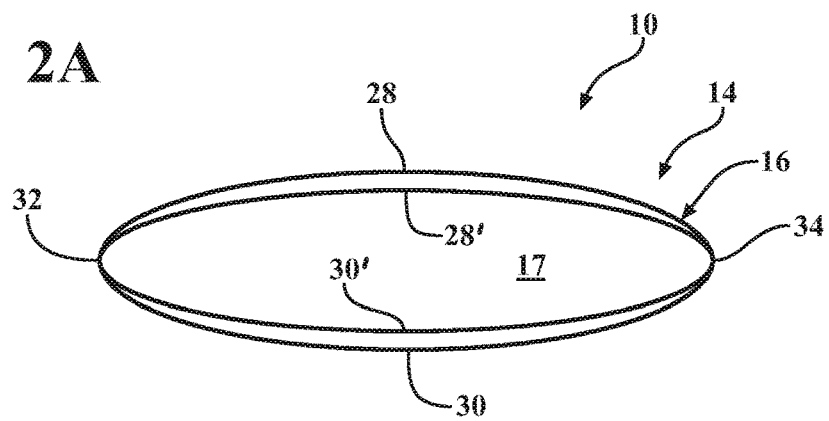
FIGS. 2A-2D are schematic cross-sectional views taken generally along the line 2-2 of FIG. 1 of different embodiments of a wall of the sleeve of FIG. 1.
Figure 3A:
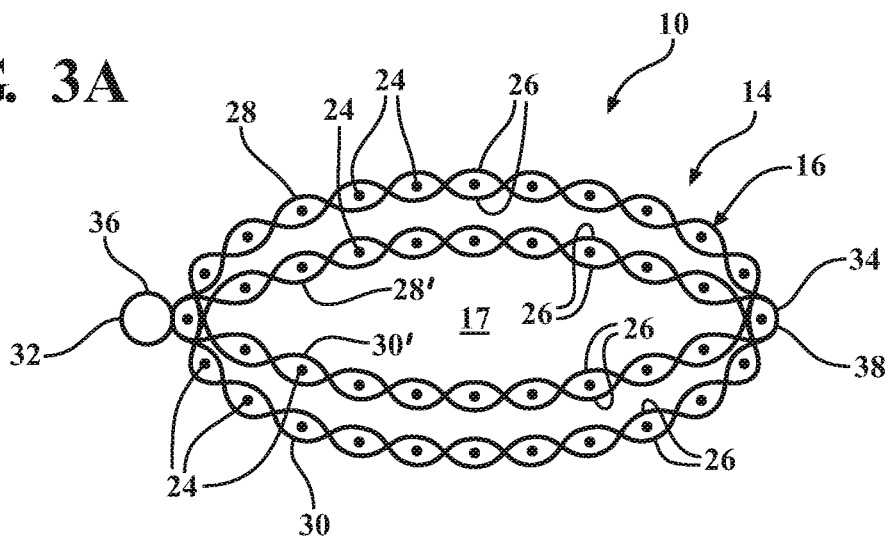
FIGS. 3A-3D are views showing weft and warp yarns of the embodiments of FIGS. 2A-2D, respectively.

In accordance with one aspect of the invention, the sleeve 10, as shown in FIGS. 2A and 3A, has a plurality of layers overlying and abutting one another about the entirety or a substantial entirety of the outer periphery 16. The plurality of layers extends about the cavity 17 along diametrically opposite sides of the wall 14 from one end 20 to the opposite end 22. One set of overlying and abutting layers, shown as a pair of layers 28, 28', by way of example and without limitation, extends along one side of the axis 18, and another set of overlying and abutting layers, shown as a pair of layers 30, 30', by way of example and without limitation, extends along the opposite side of the axis 18. The layers 28, 28' are integrally fixed and interlinked with the layers 30, 30' along opposite lengthwise extending edges 32, 34. The interlinking of the layers 28, 28' with the layer 30, 30' can be performed simultaneously with the weaving of the layers 28, 28', 30, 30', such as directly on a weaving machine, for example, via weft yarn common to both sets of layers 28, 28', 30, 30' and/or via a separate yarn stitched to join one or both of the edges 32, 34, sometimes referred to as a binder yarn. In one example, one edge 32 is interlinked via a knit stitch 36, while the opposite edge 34 is interlinked via a weft yarn 38 common to both sets of layers 28, 28', 30, 30'.

The layers 28, 28', 30, 30' each contain shrinkable fill yarn 26, wherein the fill yarn of the layers 28, 28', 30, 30' can be provided entirely of the shrinkable yarn, or partially from shrinkable yarn. If provided in part of shrinkable yarn, at least some of the remain non-shrinkable yarn 26 can be woven in bundled relation, as a single pick, with the shrinkable fill yarn 26, such as by being twisted, served or inserted in side-by-side, abutting relation therewith. Otherwise, it is contemplated that the non-shrinkable fill yarn 26 could be woven as a single yarn, and thus as a separate pick, from the shrinkable fill yarn 26.

With the shrinkable fill yarn 26 being woven in a non-shrunken state, the sleeve 10 is formed with the wall 14 being enlarged such that the cavity 17 is suitably sized to readily receive the elongate member 12 therethrough. The ratio between the first, as woven diameter and the second, as shrunk diameter can range between about 1.5:1 to 5:1 or greater. At such, if the elongate member 12 has enlarged fittings, connectors, oddly shaped branches, or the like, it can still be easily inserted through the cavity 17 of the sleeve 10. The shrinkable fill yarn 26 can be provided as either multifilament or monofilament, and can be provided having a size ranging between about 50 to 10000 denier. Upon disposing the elongate member 12 through the cavity 17, the wall 14 can be activated to shrink into close fit, snug relation about the elongate member 12 (FIG. 1A) via selected application of at least one of heat, fluid, and ultraviolet radiation, depending on the type of shrinkable fill yarn 26 used. Accordingly, the sleeve 10 becomes fixed about the elongate member 12 without need for secondary fixation mechanisms, thereby doing away for the need for clamps, straps, tape, or the like. Further yet, the woven wall 14 becomes densified upon being shrunk, and thus, the protective attributes of the wall 14, such as impact resistance, abrasion resistance, impermeability, among other things, are greatly increased. For example, the density can increase from a first density in a non-shrunken state to a second density in a shrunken state by 2 times or greater, and in one sample, the density increased from 243 kg/m$^3$ to 552 kg/m$^3$, by way of example and without limitation. In addition, with the wall 14 being brought into a close, snug fit about the elongate member 12, the thickness and outer envelop of the wall 14 is minimized, thereby being useful in tight areas. In one sample, the finish thickness of the wall 14 was about 2.6 mm, by way of example and without limitation.

The warp yarns 24 can be provided as multifilaments and/or monofilaments of at least one or more of PET, nylon, PP, PE, PPS, PEEK, and Nomex material yarns. The denier of the warp yarns 24 can range from 50 to 10000. It has been found that relatively bulky multifilaments, such as a 1200 denier of PET, by way of example and without limitation, provide the increased loft to further facilitate dampening impact forces, while also enhancing flexibility of the sleeve 10. The warp density, i.e. number of ends of the warp yarns 24, can be adjusted as desired for the intended application, with a high density providing an increased impact resistance, though tending to lessen the ratio of diametric shrink from the "as woven assembly state" to the shrunken state.

Figure 2B:
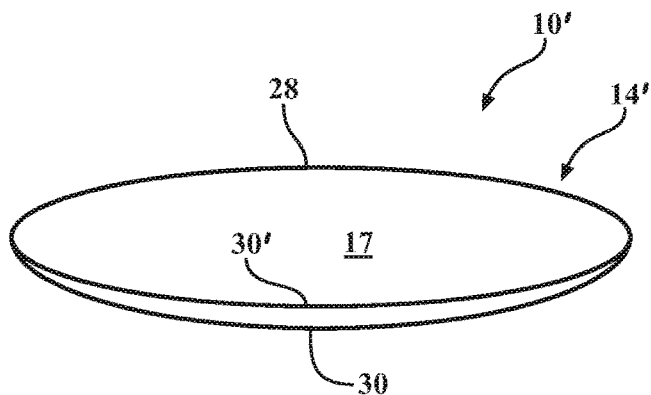
Figure 2C:
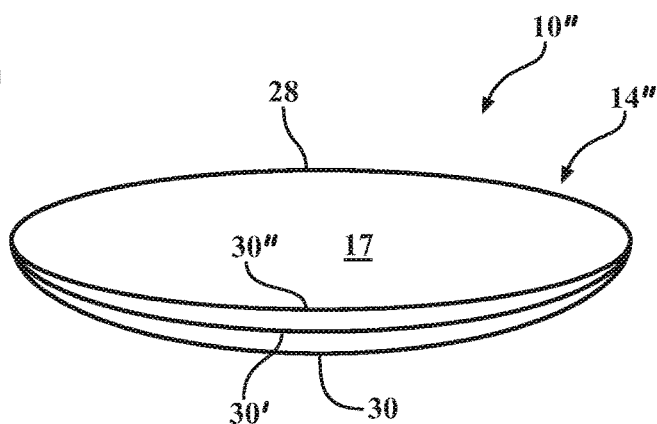
Figure 2D:
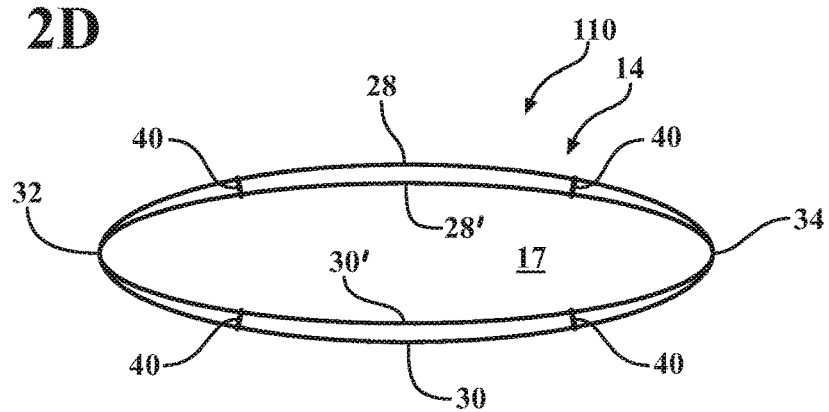
Figure 3B:
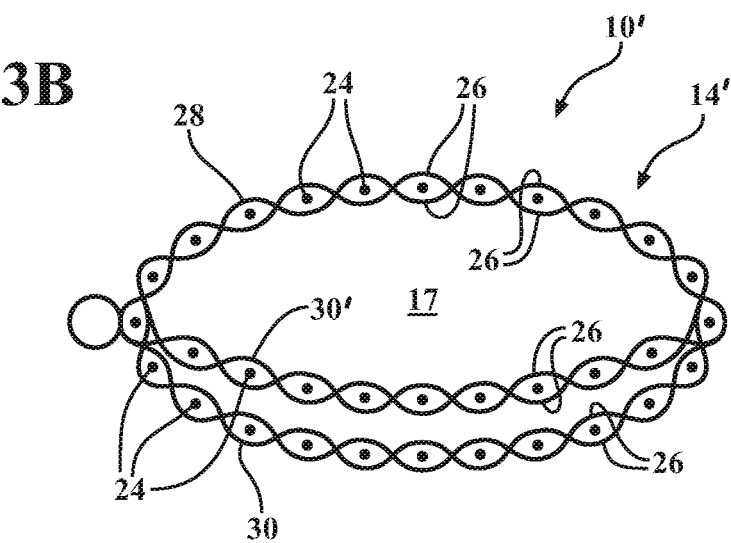
Figure 3C:
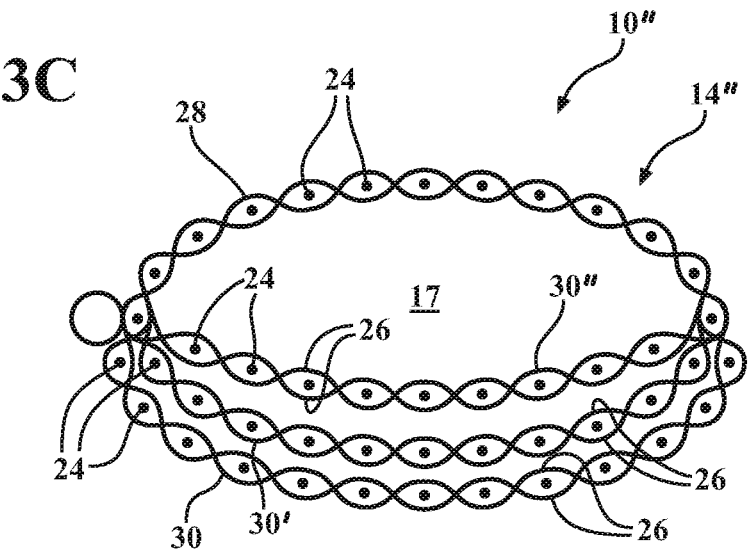
Figure 3D:
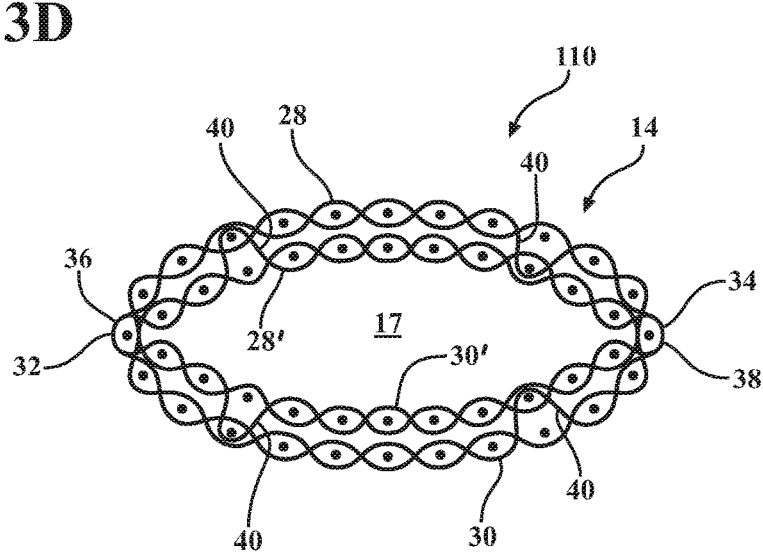
Figure 4:
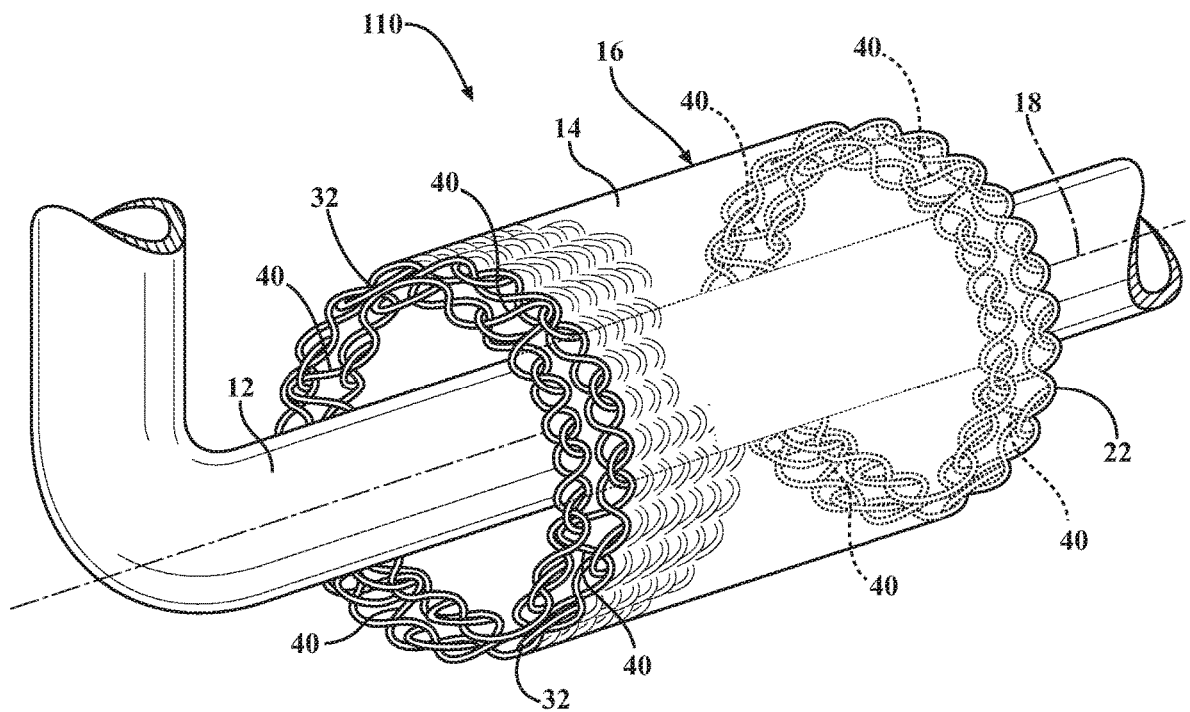
FIG. 4 is a perspective view of the sleeve as discussed with reference to FIGS. 2D and 3D.

In FIGS. 2D and 3D, a sleeve 110 is shown in accordance with another aspect of the invention, wherein the same reference numerals are used to identify like features as discussed with regard to the sleeve 10 of FIGS. 2A and 3A. A plurality of layers overlying one another, 28, 28' and 30, 30', can be interlinked together, such as by being woven together via one or more weft yarn(s) common to the respective plurality of layers 28, 28' and 30, 30' at select locations to form an interlinked region via link stitches or ties 40 that bind the layers 28, 28' together and bind the layers 30, 30' together to prevent inadvertent insertion of the elongate member 12 between the respective layers 28, 28' and 30, 30', thereby assuring the elongate member 12 is disposed with the intended cavity 17. Accordingly, the plurality of layers overlying and abutting one another 28, 28' and 30, 30', respectively, are effectively locked together to prevent separation of the layers 28, 28' and 30, 30' from one another via the at least one weft yarn 40 extending from one of the layers 28, 30 and meandering over one or more warp yarns 24 within the other of the overlying and abutting layer(s) 28', 30' It is to be recognized the number of interlinked locations and location thereof can be selected as desired. The sleeve 110 is shown in FIG. 4, wherein a pair of the ties 40 is present adjacent each of the opposite ends 20, 22, thereby preventing the inadvertent separation of the layers 28, 28' and 30, 30' from one another, as discussed. It is to be recognized that as may ties as desired can be formed about the circumference and along the length of the sleeve 110 as desired.

Figure 5:
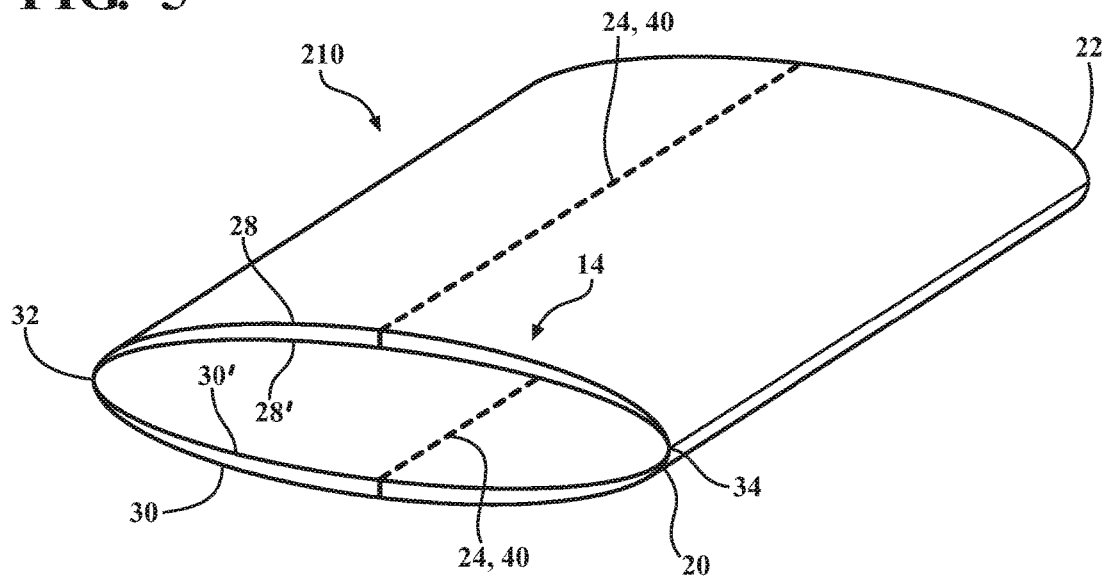
FIG. 5 is a schematic perspective view of a tubular, woven sleeve constructed in accordance with one aspect of the invention.
Figure 5A:
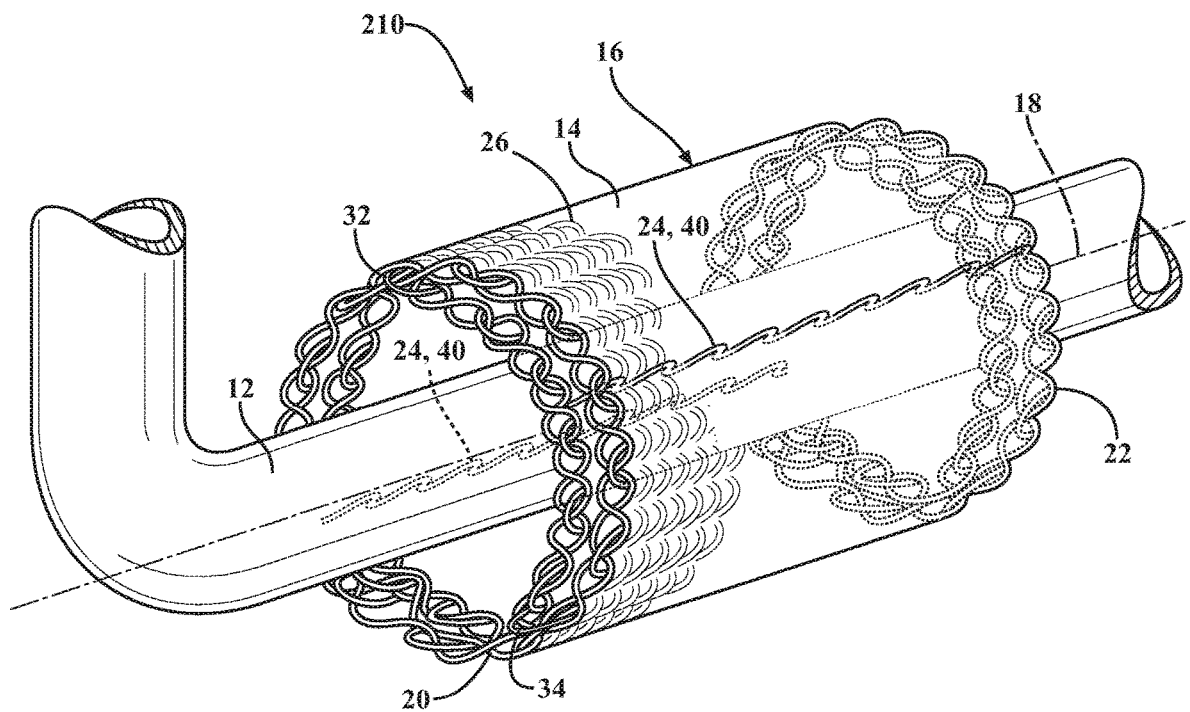
FIG. 5A is a perspective view of the sleeve as discussed with reference to FIG. 5.
Figures 6, 7:
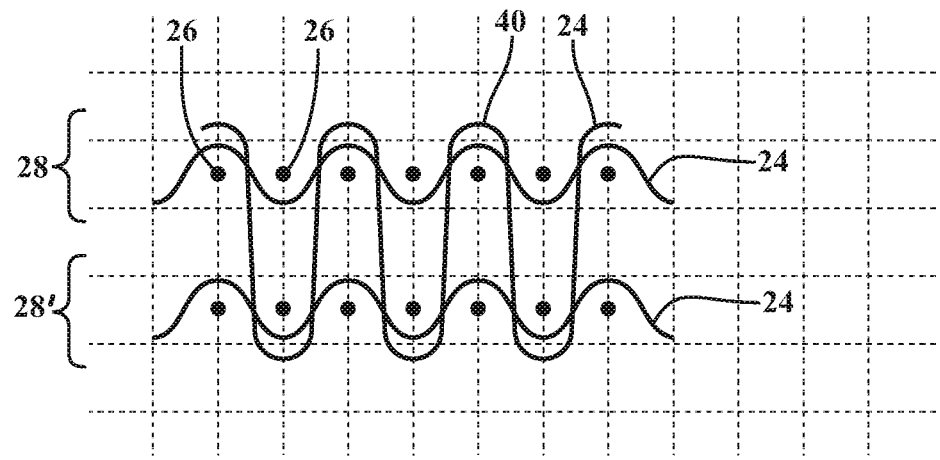
FIG. 6 is a partial view of a wall of the sleeve of FIG. 5 showing weft and warp yarns thereof and showing an interlinked region linking a plurality of overlying layers to one another.
FIG. 7 is a weave pattern diagram of the sleeve of FIG. 5.

In FIGS. 5 and 5A, a sleeve 210 is shown in accordance with another aspect of the invention, wherein the same reference numerals are used to identify like features as discussed with regard to the sleeve 10 of FIGS. 2A and 3A. A plurality of layers overlying one another, 28, 28' and 30, 30', can be interlinked together, such as by forming a link stitch(es) 40 via weaving at least one warp yarn 24 to meander over one or more weft yarns 26 within an outermost one of the layers 28, 30 and over one or more weft yarns 26 within an innermost one of the layers 28', 30' (see FIGS. 6 and 7; it is to be recognized that the term "over" is intended to mean the warp yarn 24 extends radially outwardly from the corresponding weft yarn 26 to extend around the corresponding weft yarn 26). The link stitch 40 can extend along at least a portion of an axially extending length of the sleeve 210, shown as extending along the entire length of the sleeve 210 from one end 22 to the opposite end 22, by way of example and without limitation. With the respective overlying and abutting layers 28, 28' and 30, 30' being interlinked and tied together via the link stitch(es) 40, the inadvertent insertion of the elongate member 12 to be protected between the respective layers locked to one another 28, 28' and 30, 30' is prevented, thereby assuring the elongate member 12 is disposed within the intended central cavity 17. Thus, the full protective properties of the sleeve 210 are provided to the elongate member 12, as intended. As discussed above with regard to the link stitches 40 for the sleeve 110, the link stitch 40 can be formed as a single link stitch extending between each of the overlying and abutting layers 28, 28' and 30, 30' or it can be provided as a plurality of link stitches spaced circumferentially from one another, as desired.

In accordance with another aspect of the invention, the wall 14 can be woven including low melt yarn having a melt temperature less than that of the remaining yarns, wherein the low melt yarn, upon being melted, facilitates cutting the sleeve to length and minimizing the potential for end fray. The low melt yarn can be included as a fill yarn 26 and/or warp yarn 24 at selected locations.

In accordance with another aspect of the invention, the first, diametrically enlarged assembly state can be provided having a first diameter and the second, diametrically constricted state can be provided having a second diameter, wherein a ratio between the first and second diameters can range between about 1.5 to 10, or greater.

In FIGS. 2B and 3B, a sleeve 10' is shown in accordance with another aspect of the invention. The sleeve 10', in contrast to the sleeve 10 of FIGS. 2A and 3A, has one of the sides having a first number of layers extending from one end to the opposite end and the other of the sides having a second number of layers extending from one end to the opposite end, wherein the first and second number of layers are different, thereby providing different levels of protection against impact forces from one another and providing the wall 14' with an optimal thickness and outer envelop for the given application. In the example shown, one side has a single woven layer 28, thus minimizing the weight, thickness and enhancing flexibility, while the opposite side has a pair of woven layers 30, 30' overlying one another. As such, the layers 30, 30' are intended to be oriented toward a direction in use that is anticipated to have an increased potential for experiencing impact forces and exposure to other potentially damaging factors, such as abrasion and contamination. Other than the difference in the number of layers, the construction of the wall 14' is generally the same as discussed above, and thus, no further discussion is necessary.

In FIGS. 2C and 3C, a sleeve 10" is shown in accordance with another aspect of the invention. The sleeve 10", in contrast to the sleeve 10' of FIGS. 2B and 3B, has one side with a single woven layer 28 extending from one end to the opposite end, while the opposite side has three woven layers 30, 30', 30" overlying one another and extending from one end to the opposite end. As such, the multilayered side provides further enhanced protection to the elongate member contained in the cavity 17, particularly against impact forces. Other than the difference in the number of layers, the construction of the wall 14" is generally the same as discussed above, and thus, no further discussion is necessary.

In each of the embodiments discussed and illustrated, the portion of the wall having multiple layers can be constructed with each layer being formed of the same yarn materials or different yarn materials from one another, and further, each layer can be formed having the same weave pattern or a different weave pattern from one another. Accordingly, one or more layers of a multilayered region can be formed of one type of yarn (including monofilament and/or multifilament of one material and one type of weave pattern, such as plain, basket, twill, satin, for example), while other layers of the multilayered region can be formed of a different type of yarn and/or a different weave pattern (including monofilament and/or multifilament of a different material and one type of a different weave pattern). As such, the wall and the individual layers of the multilayered region can be optimized for the desired type of protection desired.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting elongate members, comprising:
    an elongate, woven wall having a circumferentially continuous, tubular outer periphery bounding a single central cavity extending along a central axis between opposite open ends, said wall including warp yarns extending generally parallel to the central axis and fill yarns extending generally transversely to said warp yarns, said wall having separate first and second portions forming diametrically opposite halves of said outer periphery, said first and second portions being attached to one another along a pair of diametrically opposite interconnect regions extending from one of said opposite open ends to the other of said opposite open ends, with at least one of said first portion and said second portion having a plurality of layers overlying and abutting one another along a common side of said central axis, at least some of said fill yarns include shrinkable yarn allowing said wall to be radially constricted from a diametrically enlarged first state to a diametrically constricted second state; and
    at least one stitch interconnecting said plurality of layers to one another in spaced relation from said interconnect regions, said at least one stitch being formed by at least one of said warp and fill yarns extending between said plurality of layers.

2. The textile sleeve of claim 1, wherein said interconnect regions are formed by at least one of said fill yarns.

3. The textile sleeve of claim 1, wherein said at least one stitch is formed by at least one of said fill yarns.

4. The textile sleeve of claim 3, wherein said at least one stitch includes a plurality of stitches interconnecting said plurality of layers to one another between said interconnect regions.

5. The textile sleeve of claim 1, wherein said at least one stitch is formed by at least one of said warp yarns extending over a fill yarn of an outermost layer of said plurality of layers and under a fill yarn of an innermost layer of said plurality of layers.

6. The textile sleeve of claim 5 wherein said at least one warp yarn interconnects said plurality of layers continuously from one of said opposite ends to the other of said opposite ends.

7. The textile sleeve of claim 1, wherein said first portion has a first number of said plurality of layers and said second portion has a second number of said plurality of layers, wherein said first number of layers is different from said second number of layers.

8. The textile sleeve of claim 7, wherein said first number of layers is 2.

9. The textile sleeve of claim 1, wherein said at least one stitch is formed by at least one of said warp yarns.

10. The textile sleeve of claim 1, wherein at least one of said warp yarns and said fill yarns include a low melt yarn having a melt temperature less than a melt temperature of said shrinkable yarn.

11. The textile sleeve of claim 1, wherein the diametrically enlarged first state has a first diameter and the diametrically constricted second state has a second diameter, wherein the ratio of the first and second diameters is between about 1.5:1 to 5:1 or greater.

12. A method of constructing a textile sleeve, comprising:
    weaving an elongate wall with warp yarns extending generally parallel to a central axis between opposite open ends of the wall and fill yarns extending generally transversely to the warp yarns;
    forming the wall having first and second portions each forming diametrically opposite sides of an outer periphery of the wall, with at least one of the first and second portions having a plurality of woven layers overlying and abutting one another along a common side of the central axis with one another with the first and second portions being attached to one another along a pair of diametrically opposite interconnect regions;
    forming the woven wall being circumferentially continuous, such that the first and second portions of the wall bound a single, common cavity extending between the opposite open ends, with the cavity being sized for receipt of an elongate member to be protected therein;

providing one or more of the fill yarns as being shrinkable yarn, wherein the shrinkable yarn provides the wall with an ability to be radially constricted from a first, diametrically enlarged state to a second, diametrically constricted state; and weaving at least one of the fill yarn or warp yarn of at least one of the plurality of woven layers about a respective warp yarn or fill yarn of another of the plurality of woven layers to interconnect said plurality of woven layers to one another in spaced relation from said pair of interconnect regions between said pair of interconnect regions.

13. The method of claim 12, further including weaving one of the sides having a first number of layers and weaving the other of the sides having a second number of layers, wherein the first and second number of layers are different.

14. The method of claim 12, further including providing the at least one shrinkable yarn as being activateable to shrink via selected application of at least one of heat, fluid, and ultraviolet radiation.

15. The method of claim 12, further including weaving the at least one shrinkable yarn as a single pick with a non-shrinkable yarn, with the shrinkable and non-shrinkable yarns being twisted, served or inserted with one another.

16. The method of claim 12, further including providing the warp yarns as multifilaments and/or monofilaments.

17. The method of claim 12, further including weaving the wall to increase in density from the first, diametrically enlarged state to the second, diametrically constricted state by 2 times or more.

18. The method of claim 12, further including weaving the wall to include low melt yarn having a melt temperature less than that of the remaining yarns, wherein the low melt yarn can be melted and solidified to facilitate cutting the sleeve to length with minimal end fray resulting at the cut ends.

19. The method of claim 12, further including providing the first, diametrically enlarged state having a first diameter and providing the second, diametrically constricted state having a second dimeter, wherein a ratio between the first and second diameters can range between about 1.5:1 to 5:1 or greater.

20. The method of claim 12, further including weaving at least one of the plurality of layers overlying and abutting one another having a different type of yarn material from another of the plurality of layers overlying and abutting one another.

21. The method of claim 12, further including weaving at least one of the plurality of layers overlying and abutting one another having a different weave pattern from another of the plurality of layers overlying and abutting one another.

* * * * *